US012538058B2

(12) United States Patent
Yu et al.

(10) Patent No.: US 12,538,058 B2
(45) Date of Patent: Jan. 27, 2026

(54) EARPHONE ASSEMBLY, EARPHONE CASE, AND WATCH

(71) Applicant: Huawei Technologies Co., Ltd., Shenzhen (CN)

(72) Inventors: Jun Yu, Shenzhen (CN); Jie Huang, Shanghai (CN); Qiang Huang, Shenzhen (CN)

(73) Assignee: HUAWEI TECHNOLGOIES CO., LTD., Shenzhen (CN)

(*) Notice: Subject to any disclaimer, the term of this patent is extended or adjusted under 35 U.S.C. 154(b) by 153 days.

(21) Appl. No.: 18/692,165

(22) PCT Filed: Sep. 13, 2022

(86) PCT No.: PCT/CN2022/118357

§ 371 (c)(1),
(2) Date: Mar. 14, 2024

(87) PCT Pub. No.: WO2023/040814

PCT Pub. Date: Mar. 23, 2023

(65) Prior Publication Data

US 2025/0142240 A1 May 1, 2025

(30) Foreign Application Priority Data

Sep. 14, 2021 (CN) ......................... 202122236832.1
Jan. 14, 2022 (CN) ......................... 202220107110.8

(51) Int. Cl.
*H04R 1/02* (2006.01)
*G04G 17/08* (2006.01)
*H04R 1/10* (2006.01)

(52) U.S. Cl.
CPC ............. *H04R 1/028* (2013.01); *G04G 17/08* (2013.01); *H04R 1/1016* (2013.01); *H04R 1/1025* (2013.01); *H04R 2460/17* (2013.01)

(58) Field of Classification Search
CPC .... H04R 1/028; H04R 1/1025; H04R 1/1016; H04R 2460/17; A45C 11/001; A45C 13/00; A45C 13/1069; G04G 17/08
See application file for complete search history.

(56) References Cited

U.S. PATENT DOCUMENTS 11,115,746 B1 * 9/2021 Morrison ............. H04R 1/1025
2007/0042821 A1 * 2/2007 Lee ........................ H04B 1/385
455/575.2

(Continued)

FOREIGN PATENT DOCUMENTS

CN 208798167 U 4/2019
CN 109892756 A 6/2019

(Continued)

*Primary Examiner* — Jason R Kurr
(74) *Attorney, Agent, or Firm* — Conley Rose, P.C.

(57) ABSTRACT

An earphone assembly includes an earphone and the earphone case, where the earphone has a first magnetic piece, and the earphone case includes a case body and a lid. The case body is provided with an accommodating slot configured to accommodate the earphone, and the lid is configured to open or close the case body. A second magnetic piece is disposed on the lid and is magnetically attached to the first magnetic piece. When the lid is lifted to open the case body, the earphone moves with the lid and is detached from the accommodating slot. When the lid is closed to close the case body, the earphone is attached to the lid and moves with the lid until the earphone is accommodated in the accommodating slot.

20 Claims, 5 Drawing Sheets

(56) References Cited

U.S. PATENT DOCUMENTS

| | | | | |
|---|---|---|---|---|
| 2018/0262826 | A1* | 9/2018 | Ingram | H04B 1/3883 |
| 2019/0069066 | A1* | 2/2019 | Song | H04R 1/1041 |
| 2021/0337303 | A1* | 10/2021 | Macomber | A45C 11/001 |

FOREIGN PATENT DOCUMENTS

| | | | |
|---|---|---|---|
| CN | 211703725 | U | 10/2020 |
| CN | 113329300 | A | 8/2021 |
| WO | 2018166486 | A1 | 9/2018 |

* cited by examiner

EARPHONE ASSEMBLY, EARPHONE CASE, AND WATCH

CROSS-REFERENCE TO RELATED APPLICATIONS

This is a U.S. National Stage of International Patent Application No. PCT/CN2022/118357 filed on Sep. 13, 2022, which claims priority to Chinese Patent Application No. 202220107110.8 filed on Jan. 14, 2022 and Chinese Patent Application No. 202122236832.1 filed on Sep. 14, 2021. All of the aforementioned applications are hereby incorporated by reference in their entireties.

TECHNICAL FIELD

This application relates to the field of electronic device technologies, and in particular, to an earphone assembly, an earphone case, and a watch.

BACKGROUND

For the convenience of carrying, earphones are usually placed into accommodating slots of an earphone case. However, in a process of placing the earphones into the accommodating slots, when the earphones are placed into the accommodating slots, it is inconvenient to align the earphones with the accommodating slots, causing difficulties for the placement. In a process of taking out the earphones from the accommodating slots, because the earphones are embedded in the accommodating slots and there is only a small part of the earphones exposed from the accommodating slots, it is also inconvenient for a user to grab the earphones. Consequently, user experience is affected.

SUMMARY

In view of this, this application provides an earphone assembly and an earphone case, so that an earphone can be easily placed into or taken out from an accommodating slot in the earphone case. This helps improve user experience. This application further provides a watch, so that an earphone can be easily placed into or taken out from an accommodating slot in a watch head. This helps improve user experience.

According to a first aspect, this application provides an earphone assembly, including an earphone and an earphone case. The earphone has a first magnetic piece, and the earphone case includes a case body and a lid. The case body is provided with an accommodating slot configured to accommodate the earphone, and the lid is configured to open or close the case body. A second magnetic piece is disposed on the lid, and the second magnetic piece is magnetically attached to the first magnetic piece.

When the lid is lifted to open the case body, the earphone moves with the lid and is detached from the accommodating slot.

When the lid is closed to close the case body, the earphone is attached to the lid and moves with the lid until the earphone is accommodated in the accommodating slot.

According to the earphone assembly in this application, the first magnetic piece is disposed on the earphone. The earphone case includes the case body and the lid. The lid is configured to open or close the case body. The second magnetic piece is further disposed on the lid. Polarities of the first magnetic piece and the second magnetic piece are opposite. The earphone is attached to the lid having the second magnetic piece by using the first magnetic piece. In this way, when the earphone is placed into the accommodating slot of the case body and the lid is closed on the case body, the earphone is attached to the lid. When the lid is opened, the earphone moves with the lid and is detached from the accommodating slot. When the lid is open relative to the case body, the earphone having the first magnetic piece is attached to the lid having the second magnetic piece. Then, the lid is closed toward the case body, and the earphone moves with the lid until the earphone is accommodated in the accommodating slot.

In conclusion, according to the earphone assembly provided in this application, it is clearly convenient to place the earphone into or take out the earphone from the accommodating slot in the earphone case. This improves user experience.

It should be noted that the first magnetic piece and the second magnetic piece may be disposed based on a specific case. For example, the first magnetic piece may be disposed on a side that is of the lid and that is close to the case body, and the first magnetic piece is disposed relative to the accommodating slot when the lid is closed on the case body. In this way, the earphone that is attached to the lid because of an attraction force between the first magnetic piece and the second magnetic piece may be detached from or placed into the accommodating slot as the lid is opened and closed.

With reference to the first aspect, in a possible design, a plurality of first magnetic pieces are disposed around a circumference of the earphone, and the plurality of first magnetic pieces are embedded in the earphone.

In the foregoing solution, the plurality of first magnetic pieces are disposed around the circumference of the earphone. In a process in which the earphone is attached to the lid, any location around the circumference of the earphone may be made closer to the lid, so that the earphone is automatically attached to the lid. In this way, in a process of placing the earphone, a user only needs to make any location around the circumference of the earphone closer to the second magnetic piece of the lid, so that the earphone can be automatically attached to the lid because of the attraction force between the first magnetic piece and the second magnetic piece, without a need to find a location at which the first magnetic piece is disposed on the earphone. This simplifies an operation and improves convenience.

With reference to the first aspect, in a possible design, the plurality of first magnetic pieces are disposed at an even interval.

In the foregoing solution, the plurality of first magnetic pieces are disposed at an even interval. The plurality of first magnetic pieces are evenly disposed, so that in a process in which the earphone is used, a probability that each location around an upper circumference of the earphone is fitted with the lid because of the attachment between the first magnetic piece and the second magnetic piece is approximately consistent. This avoids uneven wear of the earphone and improves aesthetics and a service life of the earphone.

With reference to the first aspect, in a possible design, a locating slot is provided on a surface of a side that is of the lid and that is close to the accommodating slot, and the locating slot is configured to accommodate the earphone.

In the foregoing solution, the locating slot is provided on the surface of the side that is of the lid and that is close to the accommodating slot. In a process in which the earphone is attached to the lid, the earphone may be fitted into the locating slot. This improves stability of an attachment connection between the earphone and the lid to some extent, and avoids shaking of the earphone on the lid.

In addition, when the lid is closed on the case body, the locating slot may be communicated with the accommodating slot. In this way, when the earphone is accommodated in the accommodating slot, at least a part of the earphone is fitted into the locating slot. When the lid is closed on the case body, a surface of the earphone is fitted into the locating slot and the accommodating slot. This improves stability of the earphone in the earphone case.

With reference to the first aspect, in a possible design, the second magnetic piece is disposed on each of two sides of the locating slot.

In the foregoing solution, the second magnetic piece is disposed on each of the two sides of the locating slot. The first magnetic piece on the earphone may be magnetically connected to two second magnetic pieces at the same time, or two first magnetic pieces on the earphone may be magnetically connected to two second magnetic pieces respectively. The second magnetic piece is disposed on each of the two sides of the locating slot, so that stability and accuracy of a magnetic connection between the earphone and the lid may be improved.

With reference to the first aspect, in a possible design, the earphone is fitted into the accommodating slot.

In the foregoing solution, that the earphone is fitted into the accommodating slot may mean that the accommodating slot and the earphone may be in transition cooperation or gap cooperation. The earphone is fitted into the accommodating slot in shape, so that stability of the earphone when placed into the case body may be improved.

With reference to the first aspect, in a possible design, a third magnetic piece is disposed in the accommodating slot, the third magnetic piece is magnetically connected to the first magnetic piece, and an attachment force between the third magnetic piece and the first magnetic piece is less than an attachment force between the first magnetic piece and the second magnetic piece.

In the foregoing solution, the third magnetic piece is disposed in the accommodating slot, and the third magnetic piece is magnetically connected to the first magnetic piece. In this way, connection stability between the earphone and the accommodating slot may be further improved when the earphone is placed into the accommodating slot. The attachment force between the third magnetic piece and the first magnetic piece is less than the attachment force between the first magnetic piece and the second magnetic piece, so that it is ensured that the earphone can still be attached to the lid when the lid is opened.

With reference to the first aspect, in a possible design, the earphone includes a conductive member, the conductive member is disposed on the earphone around a circumference of the earphone, a charging spring is disposed on the case body and/or the lid, and the charging spring is configured to be electrically connected to the conductive member to charge the earphone.

In the foregoing solution, the conductive member is disposed on the earphone around the circumference of the earphone. In this way, when the earphone is placed into the accommodating slot, it is ensured that at least a part of the conductive member is electrically connected to the charging spring by rotating the earphone around the circumference at any angle. Therefore, when the earphone is placed into the accommodating slot for charging, electrical contact between the earphone and the charging spring is ensured without adjusting an angle. This improves convenience.

According to a second aspect, this application provides an earphone case. The earphone case is adapted to an earphone having a first magnetic piece. The earphone case includes a case body and a lid. The case body is provided with an accommodating slot configured to accommodate the earphone. The lid is configured to open or close the case body. A second magnetic piece is disposed on the lid, and the second magnetic piece is magnetically attached to the first magnetic piece.

When the lid is lifted to open the case body, the earphone moves with the lid and is detached from the accommodating slot.

When the lid is closed to close the case body, the earphone is attached to the lid and moves with the lid until the earphone is accommodated in the accommodating slot.

In the foregoing solution, the first magnetic piece is disposed on the earphone. The earphone case includes the case body and the lid. The lid is configured to open or close the case body. The second magnetic piece is further disposed on the lid. Polarities of the first magnetic piece and the second magnetic piece are opposite. The earphone is attached to the lid having the second magnetic piece by using the first magnetic piece. In this way, when the earphone is placed into the accommodating slot of the case body and the lid is closed on the case body, the earphone is attached to the lid. When the lid is opened, the earphone moves with the lid and is detached from the accommodating slot. When the lid is open relative to the case body, the earphone having the first magnetic piece is attached to the lid having the second magnetic piece. Then, the lid is closed toward the case body, and the earphone moves with the lid until the earphone is accommodated in the accommodating slot.

In conclusion, according to the earphone assembly provided in this application, it is clearly convenient to place the earphone into or take out the earphone from the accommodating slot in the earphone case. This improves user experience.

With reference to the second aspect, in a possible design, a locating slot is provided on a surface of a side that is of the lid and that is close to the accommodating slot, and the locating slot is configured to accommodate the earphone.

In the foregoing solution, the locating slot is provided on the surface of the side that is of the lid and that is close to the accommodating slot. In a process in which the earphone is attached to the lid, the earphone may be fitted into the locating slot. This improves stability of an attachment connection between the earphone and the lid to some extent, and avoids shaking of the earphone on the lid.

With reference to the second aspect, in a possible design, the second magnetic piece is disposed on each of two sides of the locating slot.

In the foregoing solution, the second magnetic piece is disposed on each of the two sides of the locating slot. The first magnetic piece on the earphone may be magnetically connected to two second magnetic pieces at the same time, or two first magnetic pieces on the earphone may be magnetically connected to two second magnetic pieces respectively. The second magnetic piece is disposed on each of the two sides of the locating slot, so that stability and accuracy of a magnetic connection between the earphone and the lid may be improved.

With reference to the second aspect, in a possible design, the earphone is fitted into the accommodating slot.

In the foregoing solution, that the earphone is fitted into the accommodating slot may mean that the accommodating slot and the earphone may be in transition cooperation or gap cooperation. The earphone is fitted into the accommodating slot in shape, so that stability of the earphone when placed into the case body may be improved.

With reference to the second aspect, in a possible design, a third magnetic piece is disposed in the accommodating slot, the third magnetic piece is magnetically connected to the first magnetic piece, and an attachment force between the third magnetic piece and the first magnetic piece is less than an attachment force between the first magnetic piece and the second magnetic piece.

In the foregoing solution, the third magnetic piece is disposed in the accommodating slot, and the third magnetic piece is magnetically connected to the first magnetic piece. In this way, connection stability between the earphone and the accommodating slot may be further improved when the earphone is placed into the accommodating slot. The attachment force between the third magnetic piece and the first magnetic piece is less than the attachment force between the first magnetic piece and the second magnetic piece, so that it is ensured that the earphone can still be attached to the lid when the lid is opened.

According to a third aspect, this application provides a watch. The watch includes a watch head and a watch band. The watch band is configured to fasten the watch head to a part of a human body. The watch further includes an earphone having a first magnetic piece. The watch head includes a head body and a watch cover. The head body is provided with an accommodating slot configured to accommodate the earphone, and the watch cover is configured to open or close the head body. A second magnetic piece is disposed on the watch cover, and the second magnetic piece is magnetically attached to the first magnetic piece.

When the watch cover is lifted to open the head body, the earphone moves with the watch cover and is detached from the accommodating slot.

When the watch cover is closed to close the head body, the earphone is attached to the watch cover and moves with the watch cover until the earphone is accommodated in the accommodating slot.

In the foregoing solution, the watch includes the watch head and the watch band. The watch head includes the head body and the watch cover. The head body is provided with the accommodating slot configured to accommodate the earphone. When the earphone is not used, the earphone may be accommodated in the accommodating slot. This improves portability of the earphone. When the earphone needs to be used, the watch cover is taken away from the head body, and the earphone moves with the watch cover and is detached from the accommodating slot. This improves convenience of taking the earphone. When the earphone needs to be placed back into the accommodating slot, the earphone does not need to be aligned with the accommodating slot, and only need to be placed near the second magnetic piece on the watch cover. In this case, the earphone is automatically attached to the watch cover because of an attachment force between the first magnetic piece and the second magnetic piece. In this case, the watch cover is closed on the head body, and the earphone moves with the watch cover until the earphone is accommodated in the accommodating slot. This improves convenience of accommodating the earphone.

With reference to the third aspect, in a possible design, a plurality of first magnetic pieces are disposed around a circumference of the earphone, and the plurality of first magnetic pieces are embedded in the earphone.

With reference to the third aspect, in a possible design, the plurality of first magnetic pieces are disposed at an even interval.

With reference to the third aspect, in a possible design, a locating slot is provided on a surface of a side that is of the watch cover and that is close to the accommodating slot, and the locating slot is configured to accommodate the earphone.

With reference to the third aspect, in a possible design, the second magnetic piece is disposed on each of two sides of the locating slot.

With reference to the third aspect, in a possible design, the earphone is fitted into the accommodating slot.

With reference to the third aspect, in a possible design, a third magnetic piece is disposed in the accommodating slot, the third magnetic piece is magnetically connected to the first magnetic piece, and an attachment force between the third magnetic piece and the first magnetic piece is less than an attachment force between the first magnetic piece and the second magnetic piece.

With reference to the third aspect, in a possible design, the earphone includes a conductive member, the conductive member is disposed on the earphone around a circumference of the earphone, a charging spring is disposed on the head body and/or the watch cover, and the charging spring is configured to be electrically connected to the conductive member to charge the earphone.

With reference to the third aspect, in a possible design, the watch further includes a touch display, and the touch display is disposed on a side that is of the lid and that is away from the head body.

In the foregoing solution, the touch display is disposed to enhance a display function of the watch. A side of the touch display of the watch may display information such as a battery level of the earphone. This improves usability and experience of the watch.

Additional features and advantages of embodiments of this application will be described in the specification that follows, and will be partially clear from the specification, or be learned by implementation of embodiments of this application. Objectives and other advantages of embodiments of this application are implemented and obtained in structures specifically pointed out in the specification and the accompanying drawings.

REFERENCE NUMERALS

- 100: earphone assembly;
- 1: earphone;
  - 11: first magnetic piece;
  - 12: conductive member;
- 2: earphone case;
  - 21: case body;
    - 211: accommodating slot;
    - 212: third magnetic piece;
  - 22: lid;
    - 221: second magnetic piece;
    - 222: locating slot;
  - 23: charging spring;
- 3: watch;
  - 31: watch head;
    - 311: head body;
    - 312: watch cover;
  - 32: watch band;
  - 33: touch display.

The accompanying drawings herein are incorporated into this specification and constitute a part of this specification, show embodiments conforming to this application, and are used, together with this specification, to explain the principle of this application.

DESCRIPTION OF EMBODIMENTS

Terms used in the following embodiments of this application are merely for the purpose of describing specific embodiments, and are not intended to limit this application. The terms "a" and "the" of singular forms used in embodiments of this application and the appended claims of this application are also intended to include plural forms, unless otherwise specified in the context clearly.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be noted that orientation words such as "up", "down", "left", and "right" described in embodiments of this application are described from angles shown in the accompanying drawings, and should not be understood as a limitation on embodiments of this application. In addition, in the context, it should be further understood that when it is mentioned that an element is connected "above" or "below" another element, the element can be directly connected "above" or "below" the another element, or may be indirectly connected "above" or "below" the another element by using an intermediate element.

Figure 1:
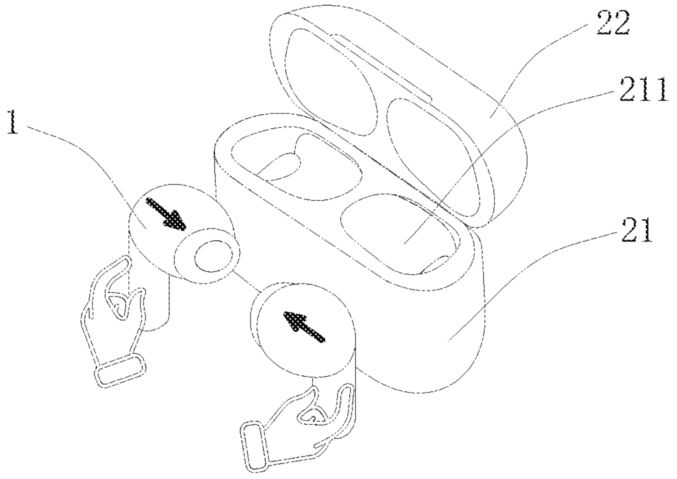
FIG. 1 is a schematic diagram of a structure of an earphone assembly in a conventional technology.

FIG. 1 is a schematic diagram of a structure of an earphone assembly 100 in a conventional technology. As shown in FIG. 1, the earphone assembly 100 includes an earphone 1 and an earphone case 2. The earphone case 2 includes a case body 21 and a lid 22. The case body 21 is provided with an accommodating slot 211, and the earphone 1 is accommodated in the accommodating slot 211.

Figure 2:
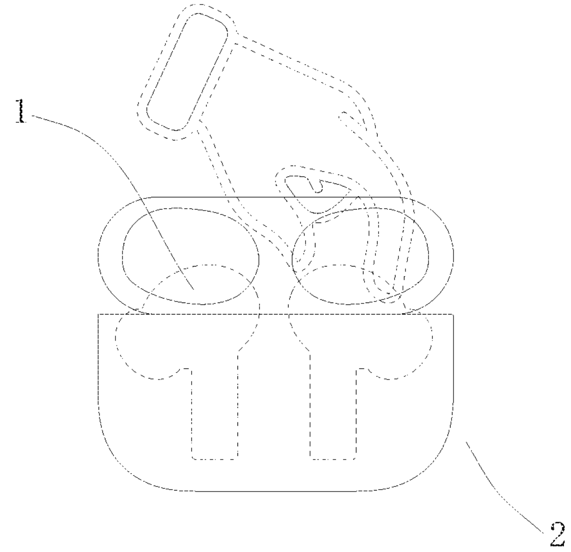
FIG. 2 is a schematic diagram of actions of taking and placing an earphone into an earphone assembly in a conventional technology.

FIG. 2 is a schematic diagram of actions of taking and placing an earphone 1 into an earphone assembly 100 in a conventional technology. As shown in FIG. 2, when the earphone 1 is used and a user opens the lid 22 to take out the earphone 1 from the accommodating slot 211, because a main part of the earphone 1 is closely embedded in the accommodating slot 211, it is very inconvenient for the user to grab the earphone 1. Correspondingly, when the user stops using the earphone 1 and plugs the earphone 1 into the accommodating slot 211, it is difficult to place the earphone 1 because of a corresponding matching relationship between the two earphones 1 and the two accommodating slots 211. In conclusion, the existing earphone assembly 100 is difficult to be used for taking and placing the earphone 1, affecting user experience during use.

The following describes a specific embodiment of the earphone assembly 100 based on a structure of the earphone assembly 100 provided in an embodiment of this application.

An embodiment of this application provides an earphone assembly 100, so that an earphone 1 can be easily placed into or taken out from accommodating slot 211 in an earphone case 2. This improves usability and helps improve user experience. The earphone 1 may be a Bluetooth earphone.

Figure 3:
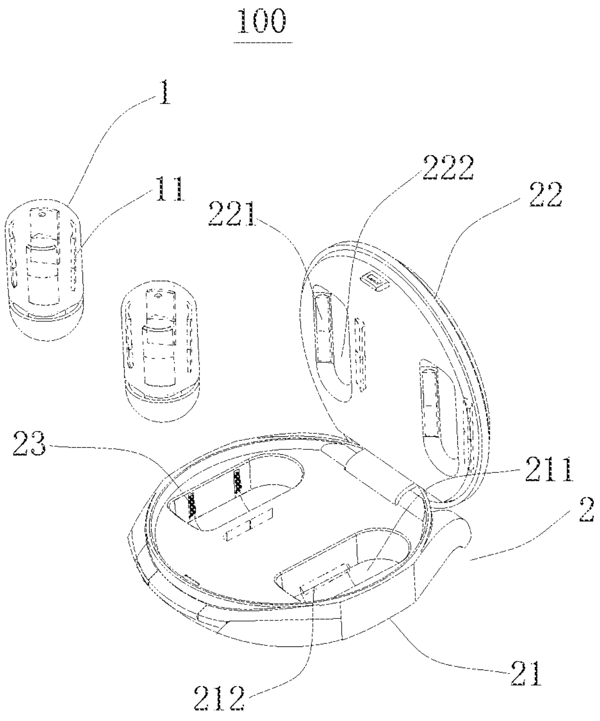
FIG. 3 is a schematic diagram of a state of an earphone assembly when an earphone is taken out according to an embodiment of this application.
Figure 4:
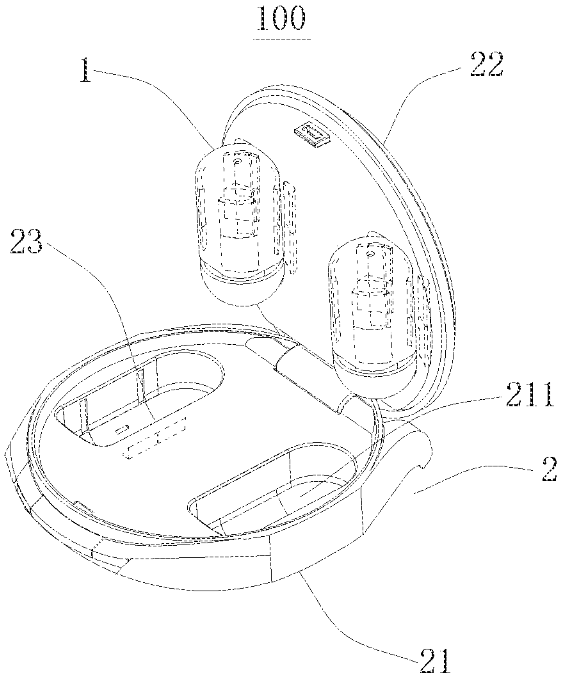
FIG. 4 is a schematic diagram in which an earphone in an earphone assembly is attached to a lid according to an embodiment of this application.

FIG. 3 is a schematic diagram of a status of the earphone assembly 100 when the earphone 1 is taken out according to an embodiment of this application. FIG. 4 is a schematic diagram in which the earphone 1 in the earphone assembly 100 is attached to a lid 22 according to an embodiment of this application. As shown in FIG. 3 and FIG. 4, the earphone assembly 100 includes the earphone 1 and the earphone case 2, the earphone 1 has a first magnetic piece 11, and the earphone case 2 includes a case body 21 and a lid 22. The case body 21 is provided with the accommodating slot 211 configured to accommodate the earphone 1, and the lid 22 is configured to open or close the case body 21. A second magnetic piece 221 is disposed on the lid 22, and the second magnetic piece 221 is magnetically attached to the first magnetic piece 11.

When the lid 22 is lifted to open the case body 21, the earphone 1 moves with the lid 22 and is detached from the accommodating slot 211.

When the lid 22 is closed to close the case body 21, the earphone 1 is attached to the lid 22 and moves with the lid 22 until the earphone 1 is accommodated in the accommodating slot 211.

According to the earphone assembly 100 in this application, the first magnetic piece 11 is disposed on the earphone 1. The earphone case 2 includes the case body 21 and the lid 22. The lid 22 is configured to open or close the case body 21. The second magnetic piece 221 is further disposed on the lid 22. When both the first magnetic piece 11 and the second magnetic piece 221 are magnets, polarities of the first magnetic piece 11 and the second magnetic piece 221 are opposite. The earphone 1 is attached to the lid 22 having the second magnetic piece 221 by using the first magnetic piece 11. In this way, when the earphone 1 is placed into the accommodating slot 211 in the case body 21 and the lid 22 is closed to on the case body 21, the earphone 1 is naturally attached to the lid 22. When the lid 22 is opened, the earphone 1 moves with the lid 22 and is detached from the accommodating slot 211. When the lid 22 is open relative to the case body 21, the earphone 1 having the first magnetic piece 11 is attached to the lid 22 having the second magnetic piece 221. Then, the lid 22 is closed toward the case body 21, and the earphone 1 moves with the lid 22 until the earphone 1 is accommodated in the accommodating slot 211.

In conclusion, according to the earphone assembly 100 provided in this application, the earphone 1 may be attached and held on to the lid 22, so that the earphone 1 can be placed into or taken out from the accommodating slot 211 in the earphone case 2. This improves user experience.

It should be noted that the first magnetic piece 11 and the second magnetic piece 221 may be permanent magnets or electromagnets, or one of the first magnetic piece 11 and the second magnetic piece 221 may be a magnet and the other may be iron, provided that a magnetic attachment force can be generated between the first magnetic piece 11 and the second magnetic piece 221.

The first magnetic piece 11 and the second magnetic piece 221 may be disposed based on a specific case. For example, the second magnetic piece 221 may be disposed on a side that is of the lid 22 and that is close to the case body 21, and the first magnetic piece 11 is disposed relative to the accommodating slot 211 when the lid 22 is closed on the case body 21. In this way, the earphone 1 attached to the lid 22 because of an attraction force between the first magnetic piece 11 and the second magnetic piece 221 may be detached from or placed into the accommodating slot 211 as the lid 22 is opened and closed.

The first magnetic piece 11 may be a single ring magnet disposed around a circumference of the earphone 1, or a plurality of first magnetic pieces 11 may be disposed around the circumference of the earphone 1, provided that magnetic attachment can be generated between the earphone 1 and the lid 22.

A connection between the case body 21 and the lid 22 may be a separable connection or an inseparable connection. In a case of the separable connection, the connection between the case body 21 and the lid 22 is a detachable connection. For example, the detachable connection may be a common snap-on connection. In this way, when the lid 22 is closed on the case body 21, the lid 22 and the case body 21 are in a snap fit to each other. In the case of the separable connection, when the lid 22 is lifted to open the case body 21, the lid 22 and the case body 21 are completely separated. In a case of the inseparable connection, the lid 22 may be hinged to the case body 21, and the lid 22 is connected to the case body 21 by using a rotating shaft assembly. In this way, the lid 22 may rotate relative to the case body 21 by using the rotating shaft assembly as a rotation center. In this way, the connection between the case body 21 and the lid 22 is stable, and with good integration.

The rotating shaft assembly may be a common rotating shaft assembly with a spring. The rotating shaft assembly with the spring gives a constant force to separate the case body 21 and the lid 22, so that the lid 22 has a tendency of flipping over to be open relative to the case body 21. Correspondingly, the case body 21 and the lid 22 may be connected by using a common snap-on structure. When the snap-on structure is opened, the lid 22, driven by the rotating shaft assembly, automatically flips over to be open relative to the case body 21. It may be understood that an angle at which the lid 22 flips over to be open and a path of the lid 22 when the lid 22 flips over may be selected based on an actual requirement. For example, after the snap-on structure is opened, the lid 22, driven by the rotating shaft assembly, flips over 25 degrees relative to the case body 21 and then stops. This improves convenience of opening the lid. When the lid is closed, the lid 22 and the case body 21 can be locked up only by fastening the snap-on structure between the case body 21 and the lid 22.

In an embodiment, the earphone assembly 100 includes two earphones 1. An outline structure of the earphone 1 may be a centrosymmetric structure, for example, a cylindrical structure. When the two earphones have a same shape structure, there is no distinction between left and right earphones 1. Either of the earphones 1 may be placed into either of the accommodating slots 211 in any direction for charging or storage. In this way, it is convenient for a user to operate, and the user does not need to place a left earphone 1 and a right earphone 1 into a corresponding left accommodating slot 211 and a corresponding right accommodating slot 211. This improves usability and user experience. Further, because the shape structure of the two earphones 1 is the same, to ensure correct matching of a sound channel when the earphone 1 is used, the user may alternatively use a manual switching or automatic identification manner, so that the earphone 1 switch correctly to a left sound channel or a right sound channel when the earphone 1 is used. To be specific, if either of the two earphones 1 is plugged into the left ear, the earphone 1 sends out a sound of the left sound channel. Correspondingly, if the other earphone 1 is plugged into the right ear, the earphone 1 sends out a sound of the right sound channel. The switch between sound channels may be implemented by the user manually or through automatic identification by using the earphone 1, so that the user does not need to distinguish a left earphone 1 from a right earphone 1 when using the earphone 1. This improves user experience.

In an embodiment, a plurality of first magnetic pieces 11 are disposed around a circumference of the earphone 1, and the plurality of first magnetic pieces 11 are embedded in the earphone 1.

Specifically, the earphone 1 may include a stem and a sound output part, and the plurality of first magnetic pieces 11 are disposed around a circumference of the stem. For example, the earphone 1 generally has a cuboid structure. In this way, at least one first magnetic piece 11 is disposed on each of four surfaces around the circumference of the earphone 1. In this way, it is ensured that there is a first magnetic piece 11 on any surface regardless of an angle of rotation of the earphone 1, and that the earphone 1 can be attached to the lid 22 having the second magnetic piece 221. Similarly, the earphone 1 may alternatively have another structure, for example, a triangular prism or a polygon prism. Correspondingly, at least one first magnetic piece 11 is disposed on each surface around the circumference of the earphone 1. In this way, in a process in which the earphone 1 is attached to the lid 22, any location around the circumference of the earphone 1 may be made closer to the lid 22 regardless of an angle of rotation of the earphone 1, so that the earphone 1 is automatically attached to the lid 22.

Figure 5:
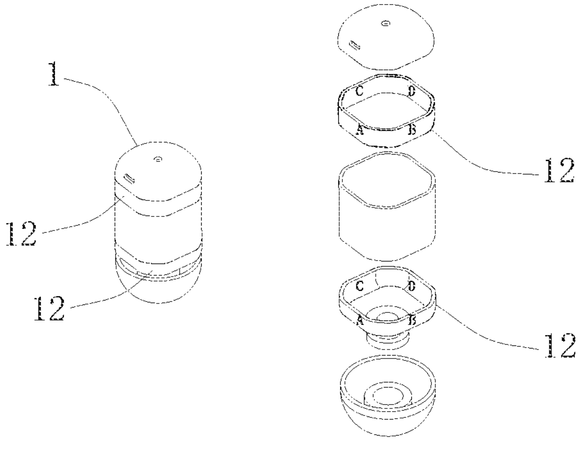
FIG. 5 is an exploded view of an earphone according to an embodiment of this application.

FIG. 5 is an exploded view of an earphone 1 according to an embodiment of this application. As shown in FIG. 5, in an embodiment, the earphone 1 includes a conductive member 12, and the conductive member 12 is disposed on the earphone 1 around a circumference of the earphone 1, a charging spring 23 is disposed on the case body 21 and/or the lid 22, and the charging spring 23 is configured to be electrically connected to the conductive member 12 to charge the earphone 1.

The conductive member 12 is disposed on the earphone 1 around the circumference of the earphone 1. In this way, when the earphone 1 is placed into the accommodating slot 211, it is ensured that at least a part of the conductive member 12 is electrically connected to the charging spring 23 by rotating the earphone 1 around the circumference at any angle. Therefore, when the earphone 1 is placed into the accommodating slot 211 for charging, electrical contact between the earphone 1 and the charging spring 23 is ensured without adjusting an angle. This improves convenience. For example, the charging spring 23 may be disposed inside the accommodating slot 211 in the case body 21, so that when the earphone 1 is placed into the accommodating slot 211, it is ensured that the conductive member 12 can be in at least partial contact with the charging spring 23. Alternatively, the charging spring 23 may be disposed on the lid 22, and when the lid 22 is closed on the case body 21, the charging spring 23 keeps being in at least partial contact with the conductive member 12 of the earphone 1 placed into the accommodating slot 211.

The foregoing setting enables the earphone 1 to be charged when the earphone 1 is placed into the earphone case 2. This facilitates a charging operation of the earphone 1 and improves user experience.

Figure 6:
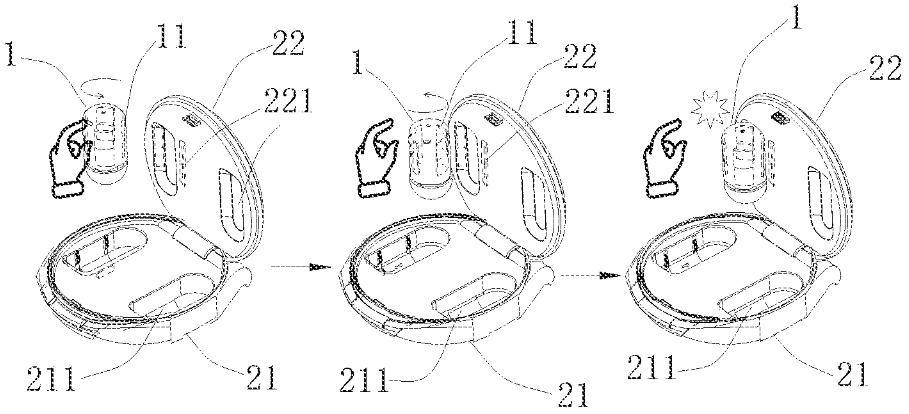
FIG. 6 is a schematic diagram of a process of an earphone assembly in which an earphone is placed according to an embodiment of this application.

FIG. 6 is a schematic diagram of a process of an earphone assembly 100 in which an earphone 1 is placed according to an embodiment of this application. As shown in FIG. 6, in other words, in a process of placing the earphone 1, a user only needs to make any location around the circumference of the earphone 1 closer to the second magnetic piece 221 of the lid 22, so that the earphone 1 can be automatically attached to the lid 22 because of the attraction force between the first magnetic piece 11 and the second magnetic piece 221, without a need to find a location at which the first magnetic piece 11 is disposed on the earphone 1. This simplifies an operation and improves convenience. In addition, the user may alternatively directly plug the earphone 1 into the accommodating slot 211 in the case body 21. The two manners of placing the earphone 1 may be freely selected based on an actual case.

In an embodiment, the plurality of first magnetic pieces 11 are disposed at an even interval.

The plurality of first magnetic pieces 11 are disposed at an even interval. The plurality of first magnetic pieces 11 are evenly disposed, so that in a process in which the earphone 1 is used, a probability that each location around an upper circumference of the earphone 1 is fitted with the lid 22 because of the attachment between the first magnetic piece 11 and the second magnetic piece 221 is approximately consistent. This avoids uneven wear of various surfaces of the earphone 1 and improves aesthetics and a service life of the earphone 1.

In an embodiment, a locating slot 222 is disposed on a surface of a side that is of the lid 22 and that is close to the accommodating slot 211, and the locating slot 222 is configured to accommodate the earphone 1.

The locating slot 222 is provided on the surface of the side that is of the lid 22 and that is close to the accommodating slot 211. In a process in which the earphone 1 is attached to the lid 22, the earphone 1 may be fitted into the locating slot 222. This improves stability of an attachment connection between the earphone 1 and the lid 22 to some extent, and avoids shaking of the earphone 1 on the lid 22.

In addition, when the lid 22 is closed on the case body 21, the locating slot 222 may be communicated with the accommodating slot 211. In this way, when a part of the earphone 1 is accommodated in the accommodating slot 211, the other part of the earphone 1 is fitted into the locating slot 222. When the lid 22 is closed on the case body 21, a surface of the earphone 1 is fitted into the locating slot 222 and the accommodating slot 211. This improves stability of the earphone 1 in the earphone case 2. Atop of the earphone 1 may be fitted into the locating slot 222 in shape. In this way, when the lid 22 is closed on the lid 22, the earphone 1 and the locating slot 222 closely cooperate with each other. This avoids shaking of the earphone 1 in the earphone case 2, and improves stability.

In an embodiment, the second magnetic piece 221 is disposed on each of two sides of the locating slot 222.

The second magnetic piece 221 is disposed on each of the two sides of the locating slot 222. The first magnetic piece 11 on the earphone 1 may be magnetically connected to two second magnetic pieces 221 at the same time, or two first magnetic pieces 11 on the earphone 1 may be magnetically connected to two second magnetic pieces 221 respectively. The second magnetic piece 221 is disposed on each of the two sides of the locating slot 222, so that stability and accuracy of a magnetic connection between the earphone 1 and the lid 22 may be improved. In addition, the two second magnetic pieces 221 may be disposed, so that the earphone 1 is magnetically connected to two contact points. Compared with a single magnetic connection, a two-point magnetic connection manner is more stable, and the earphone 1 is not prone to shaking when the earphone 1 is on the lid 22. This improves connection stability. In another embodiment, a plurality of second magnetic pieces 221 may be disposed around the locating slot 222, and the plurality of second magnetic pieces 221 may be disposed at any location around the locating slot 222.

In an embodiment, the earphone 1 is fitted into the accommodating slot 211.

That the earphone 1 is fitted into the accommodating slot 211 may mean that the accommodating slot 211 and the earphone 1 may be in transition cooperation or gap cooperation. The earphone 1 is fitted into the accommodating slot 211 in shape, so that stability of the earphone 1 when placed into the case body 21 may be improved.

In an embodiment, a third magnetic piece 212 is disposed in the accommodating slot 211, the third magnetic piece 212 is magnetically connected to the first magnetic piece 11, and an attachment force between the third magnetic piece 212 and the first magnetic piece 11 is less than an attachment force between the first magnetic piece 11 and the second magnetic piece 221.

The third magnetic piece 212 is disposed in the accommodating slot 211, and the third magnetic piece 212 is magnetically connected to the first magnetic piece 11. The first magnetic piece 11 and the third magnetic piece 212 may be permanent magnets or electromagnets with opposite polarities, or one of the first magnetic piece 11 and the third magnetic piece 212 may be a magnet and the other may be iron, provided that a magnetic attachment force can be generated between the first magnetic piece 11 and the third magnetic piece 212.

In this way, when the earphone 1 is placed into the accommodating slot 211, connection stability between the earphone 1 and the accommodating slot 211 may be further improved. In addition, when the case body 21 is inverted, because the first magnetic piece 11 on the earphone 1 is magnetically connected to the third magnetic piece 212 in the case body 21, even if the case body 21 is inverted, the earphone 1 does not slide out from the case body 21. This further improves safety and convenience of the earphone assembly 100. However, the attachment force between the third magnetic piece 212 and the first magnetic piece 11 is less than the attachment force between the first magnetic piece 11 and the second magnetic piece 221, so that it is ensured that the earphone 1 can still be attached to the lid 22 when the lid is opened.

Figure 7:
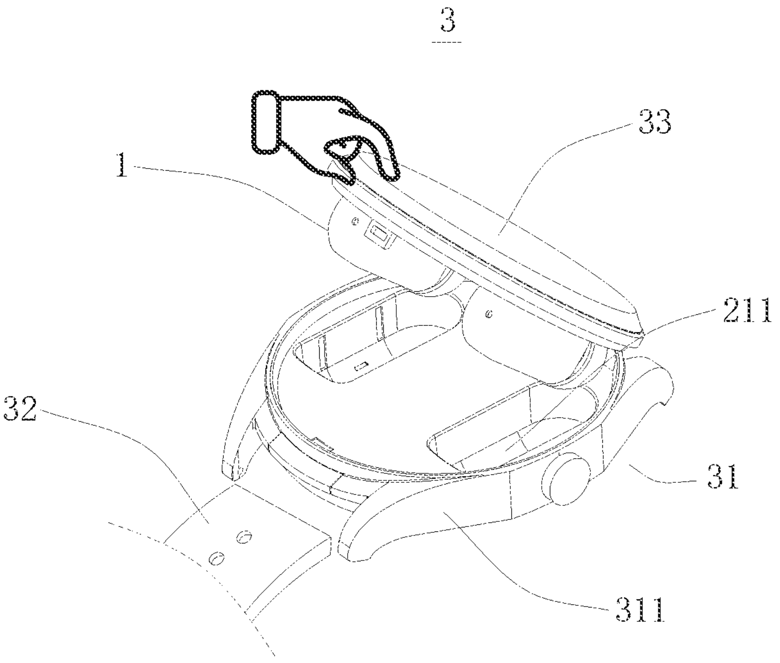
FIG. 7 is a schematic diagram of a structure of a watch according to an embodiment of this application.

FIG. 7 is a schematic diagram of a structure of a watch 3 according to an embodiment of this application. As shown in FIG. 7, this application further provides the watch 3. The watch 3 includes a watch head 31 and a watch band 32. The watch band 32 is configured to fasten the watch head 31 to a part of a human body, for example, a wrist. The watch 3 further includes an earphone 1 having a first magnetic piece 11. The watch head 31 includes a head body 311 and a watch cover 312. The head body 311 is provided with an accommodating slot 211 configured to accommodate the earphone 1. The watch cover 312 is configured to open or close the head body 311. A second magnetic piece 221 is disposed on the watch cover 312, and the second magnetic piece 221 is magnetically attached to the first magnetic piece 11.

Figure 8:
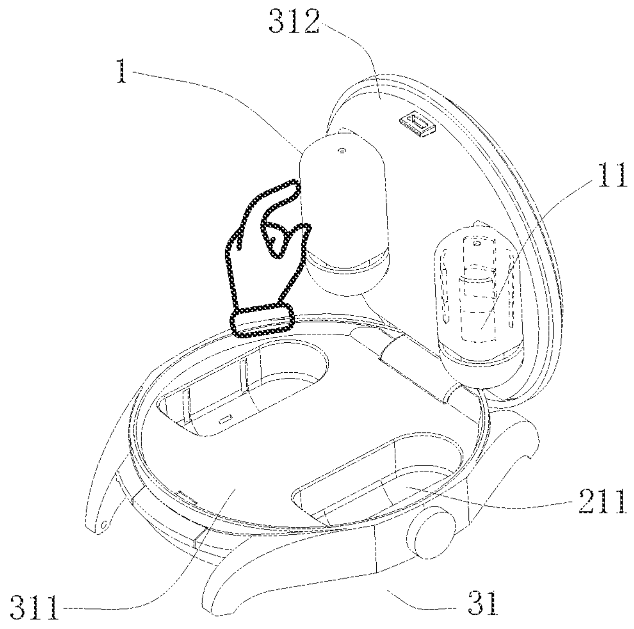
FIG. 8 is a schematic diagram in which a watch attaches an earphone to a watch cover according to an embodiment of this application.

FIG. 8 is a schematic diagram in which the watch 3 attaches an earphone 1 to the watch cover 312 according to an embodiment of this application. As shown in FIG. 8, when the watch cover 312 is lifted to open the head body 311, the earphone 1 moves with the watch cover 312 and is detached from the accommodating slot 211. When the watch cover 312 is closed to close the head body 311, the earphone 1 is attached to the watch cover 312 and moves with the watch cover 312 until the earphone 1 is accommodated in the accommodating slot 211.

The watch 3 includes the watch head 31 and the watch band 32. The watch band 32 may fasten the watch head 31 on the wrist of the human body to improve portability of the watch head 31. The watch head 31 includes the head body 311 and the watch cover 312. The head body 311 is provided with the accommodating slot 211 configured to accommodate the earphone 1. When the earphone 1 is not used, the earphone 1 may be accommodated in the accommodating slot 211. This improves portability of the earphone 1. When the earphone 1 needs to be used, the watch cover 312 is taken away from the head body 311, and the earphone 1 moves with the watch cover 312 and is detached from the accommodating slot 211. This improves convenience of taking the earphone 1. When the earphone 1 needs to be placed back into the accommodating slot 211, the earphone 1 does not need to be aligned with the accommodating slot 211, and only need to be placed near the second magnetic piece 221 on the watch cover 312. In this case, the earphone 1 is automatically attached to the watch cover 312 because of an attachment force between the first magnetic piece 11 and the second magnetic piece 221. In this case, the watch cover 312 is closed on the head body 311, and the earphone 1 moves with the watch cover 312 until the earphone 1 is accommodated in the accommodating slot 211. This improves convenience of accommodating the earphone 1.

According to the watch 3 in this application, the first magnetic piece 11 is disposed on the earphone 1. The watch head 31 includes the head body 311 and the watch cover 312. The watch cover 312 is configured to open or close the head body 311. The second magnetic piece 221 is further disposed on the watch cover 312. When both the first magnetic piece 11 and the second magnetic piece 221 are magnets, polarities of the first magnetic piece 11 and the second magnetic piece 221 are opposite. The earphone 1 is attached to the watch cover 312 having the second magnetic piece 221 by using the first magnetic piece 11. In this way, when the earphone 1 is placed into the accommodating slot 211 in the head body 311 and the watch cover 312 is closed on the head body 311, the earphone 1 is naturally attached to the watch cover 312. When the watch cover 312 is opened, the earphone 1 moves with the watch cover 312 and is detached from the accommodating slot 211. When the watch cover 312 is open relative to the head body 311, the earphone 1 having the first magnetic piece 11 is attached to the watch cover 312 having the second magnetic piece 221. Then, the watch cover 312 is closed toward the head body 311, and the earphone 1 moves with the watch cover 312 until the earphone 1 is accommodated in the accommodating slot 211.

In conclusion, according to the earphone assembly 100 provided in this application, it is clearly convenient to place the earphone 1 into or take out the earphone 1 from the accommodating slot 211 in the watch head 31. This improves user experience.

In an embodiment, a plurality of first magnetic pieces 11 are disposed around a circumference of the earphone 1, and the plurality of first magnetic pieces 11 are embedded in the earphone 1.

Specifically, the earphone 1 may include a stem and a sound output part, and the plurality of first magnetic pieces 11 are disposed around a circumference of the stem. For example, the earphone 1 generally has a cuboid structure. In this way, at least one first magnetic piece 11 is disposed on each of four surfaces around the circumference of the earphone 1. In this way, it is ensured that there is a first magnetic piece 11 on any surface regardless of an angle of rotation of the earphone 1, and that the earphone 1 can be attached to the watch cover 312 having the second magnetic piece 221. Similarly, the earphone 1 may alternatively have another structure, for example, a triangular prism or a polygon prism. Correspondingly, at least one first magnetic piece 11 is disposed on each surface around the circumference of the earphone 1. In this way, in a process in which the earphone 1 is attached to the watch cover 312, any location around the circumference of the earphone 1 may be made closer to the watch cover 312 regardless of an angle of rotation of the earphone 1, so that the earphone 1 is automatically attached to the watch cover 312.

In an embodiment, the earphone 1 includes a conductive member 12, the conductive member 12 is disposed on the earphone 1 around a circumference of the earphone 1, a charging spring 23 is disposed on the head body 311 and/or the watch cover 312, and the charging spring 23 is configured to be electrically connected to the conductive member 12 to charge the earphone 1.

The conductive member 12 is disposed on the earphone 1 around the circumference of the earphone 1. In this way, when the earphone 1 is placed into the accommodating slot 211, it is ensured that at least a part of the conductive member 12 is electrically connected to the charging spring 23 by rotating the earphone 1 around the circumference at any angle. Therefore, when the earphone 1 is placed into the accommodating slot 211 for charging, electrical contact between the earphone 1 and the charging spring 23 is ensured without adjusting an angle. This improves convenience. For example, the charging spring 23 may be disposed inside the accommodating slot 211 in the head body 311, so that when the earphone 1 is placed into the accommodating slot 211, it is ensured that the conductive member 12 can be in at least partial contact with the charging spring 23. Alternatively, the charging spring 23 may be disposed on the watch cover 312, and when the watch cover 312 is closed on the head body 311, the charging spring 23 keeps being in at least partial contact with the conductive member 12 of the earphone 1 placed into the accommodating slot 211.

The foregoing setting enables the earphone 1 to be charged when the earphone 1 is placed into the watch head 31. This facilitates a charging operation of the earphone 1 and improves user experience.

In other words, in a process of placing the earphone 1, a user only needs to make any location around the circumference of the earphone 1 closer to the second magnetic piece 221 of the watch cover 312, so that the earphone 1 can be automatically attached to the watch cover 312 because of the attraction force between the first magnetic piece 11 and the second magnetic piece 221, without a need to find a location at which the first magnetic piece 11 is disposed on the earphone 1. This simplifies an operation and improves convenience. In addition, the user may alternatively directly plug the earphone 1 into the accommodating slot 211 in the head body 311. The two manners of placing the earphone 1 may be freely selected based on an actual case.

In an embodiment, the plurality of first magnetic pieces 11 are disposed at an even interval.

The plurality of first magnetic pieces 11 are disposed at an even interval. The plurality of first magnetic pieces 11 are evenly disposed, so that in a process in which the earphone 1 is used, a probability that each location around an upper circumference of the earphone 1 is fitted with the watch cover 312 because of the attachment between the first magnetic piece 11 and the second magnetic piece 221 is approximately consistent. This avoids uneven wear of various surfaces of the earphone 1 and improves aesthetics and a service life of the earphone 1.

In an embodiment, a locating slot 222 is disposed on a surface of a side that is of the watch cover 312 and that is close to the accommodating slot 211, and the locating slot 222 is configured to accommodate the earphone 1.

The locating slot 222 is disposed on the surface of the side that is of the watch cover 312 and that is close to the accommodating slot 211. In a process in which the earphone 1 is attached to the watch cover 312, the earphone 1 may be fitted into the locating slot 222. This improves stability of an attachment connection between the earphone 1 and the watch cover 312 to some extent, and avoids shaking of the earphone 1 on the watch cover 312.

In addition, when the watch cover 312 is closed on the head body 311, the locating slot 222 may be communicated with the accommodating slot 211. In this way, when a part of the earphone 1 is accommodated in the accommodating slot 211, the other part of the earphone 1 is fitted into the locating slot 222. When the watch cover 312 is closed on the head body 311, a surface of the earphone 1 is fitted into the locating slot 222 and the accommodating slot 211. This improves stability of the earphone 1 in the watch head 31. A top of the earphone 1 may be fitted into the locating slot 222 in shape. In this way, when the watch cover 312 is closed on the watch cover 312, the earphone 1 and the locating slot 222 closely cooperate with each other. This avoids shaking of the earphone 1 in the watch head 31, and improves stability.

In an embodiment, the second magnetic piece 221 is disposed on each of two sides of the locating slot 222.

The second magnetic piece 221 is disposed on each of the two sides of the locating slot 222. The first magnetic piece 11 on the earphone 1 may be magnetically connected to two second magnetic pieces 221 at the same time, or two first magnetic pieces 11 on the earphone 1 may be magnetically connected to two second magnetic pieces 221 respectively. The second magnetic piece 221 is disposed on each of the two sides of the locating slot 222, so that stability and accuracy of a magnetic connection between the earphone 1 and the watch cover 312 may be improved. In addition, the two second magnetic pieces 221 may be disposed, so that the earphone 1 is magnetically connected to two contact points. Compared with a single magnetic connection, a two-point magnetic connection manner is more stable, and the earphone 1 is not prone to shaking when the earphone 1 is on the watch cover 312. This improves connection stability. In another embodiment, a plurality of second magnetic pieces 221 may be disposed around the locating slot 222, and the plurality of second magnetic pieces 221 may be disposed at any location around the locating slot 222.

Figure 9:
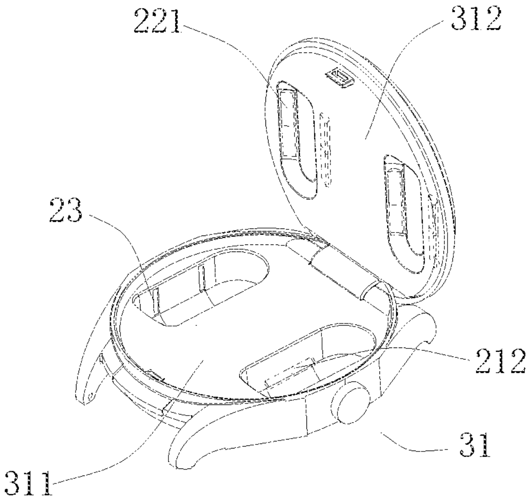
FIG. 9 is a schematic diagram of a structure of a watch head of a watch according to an embodiment of this application.

FIG. 9 is a schematic diagram of a structure of the watch head 31 of the watch 3 according to an embodiment of this application. As shown in FIG. 9, in an embodiment, the earphone 1 is fitted into the accommodating slot 211.

That the earphone 1 is fitted into the accommodating slot 211 may mean that the accommodating slot 211 and the earphone 1 may be in transition cooperation or gap cooperation. The earphone 1 is fitted into the accommodating slot 211 in shape, so that stability of the earphone 1 when placed into the head body 311 may be improved.

Figure 10:
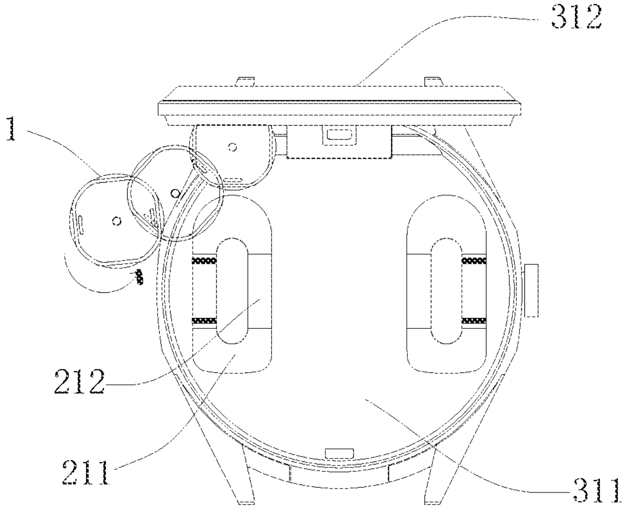
FIG. 10 is a top view of a watch head of a watch according to an embodiment of this application.

FIG. 10 is a top view of the watch head 31 of the watch 3 according to an embodiment of this application. As shown in FIG. 10, in an embodiment, a third magnetic piece 212 is disposed in the accommodating slot 211, the third magnetic piece 212 is magnetically connected to the first magnetic piece 11, and an attachment force between the third magnetic piece 212 and the first magnetic piece 11 is less than an attachment force between the first magnetic piece 11 and the second magnetic piece 221.

The third magnetic piece 212 is disposed in the accommodating slot 211, and the third magnetic piece 212 is magnetically connected to the first magnetic piece 11. The first magnetic piece 11 and the third magnetic piece 212 may be permanent magnets or electromagnets with opposite polarities, or one of the first magnetic piece 11 and the third magnetic piece 212 may be a magnet and the other may be iron, provided that a magnetic attachment force can be generated between the first magnetic piece 11 and the third magnetic piece 212.

In this way, when the earphone 1 is placed into the accommodating slot 211, connection stability between the earphone 1 and the accommodating slot 211 may be further improved. In addition, when the head body 311 is inverted, because the first magnetic piece 11 on the earphone 1 is magnetically connected to the third magnetic piece 212 in the head body 311, even if the head body 311 is inverted, the earphone 1 does not slide out from the head body 311. This further improves safety and convenience of the earphone assembly 100. However, the attachment force between the third magnetic piece 212 and the first magnetic piece 11 is less than the attachment force between the first magnetic piece 11 and the second magnetic piece 221, so that it is ensured that the earphone 1 can still be attached to the watch cover 312 when the watch cover is opened.

In an embodiment, the watch 3 further includes a touch display 33, and the touch display 33 is disposed on a side that is of the lid 22 and that is away from the head body 311.

The touch display 33 is disposed to enhance a display function of the watch 3. A side of the touch display 33 of the watch 3 may display information about a battery level of the earphone 1, and update the displayed information by using a touch operation of the user. This improves usability of the watch 3.

The foregoing descriptions are merely example embodiments of this application, but are not intended to limit this application. Any modification, equivalent replacement, or improvement made without departing from the spirit and principle of this application should fall within the protection scope of this application.

What is claimed is:

1. An earphone assembly comprising:

an earphone having a first magnetic piece; and an earphone case comprising:

a case body provided with an accommodating slot configured to accommodate the earphone; and a lid coupled to the case body, configured to open or close the case body, and comprising a second magnetic piece disposed on the lid and configured to magnetically attach to the first magnetic piece, wherein the earphone is configured to move with the lid and to detach from the accommodating slot when the lid is lifted to open the case body, and wherein the earphone is configured to attach to the lid and move with the lid until the earphone is accommodated in the accommodating slot when the lid is closed to close the case body.

2. The earphone assembly of claim 1, further comprising third magnetic pieces disposed around a circumference of the earphone and embedded in the earphone.

3. The earphone assembly of claim 2, wherein the third magnetic pieces are further disposed at an even interval.

4. The earphone assembly of claim 1, wherein the lid further comprises:

a side proximate to the accommodating slot and comprising a surface; and a locating slot provided on the surface and configured to accommodate the earphone.

5. The earphone assembly of claim 4, wherein the locating slot comprises two slot sides, and wherein the second magnetic piece is further disposed on each of the two slot sides.

6. The earphone assembly of claim 1, wherein the earphone is further configured to fit into the accommodating slot.

7. The earphone assembly of claim 1, further comprising a third magnetic piece disposed in the accommodating slot and magnetically coupled to the first magnetic piece, wherein the third magnetic piece and the first magnetic piece are configured to have a first attachment force therebetween, and wherein the first magnetic piece and the second magnetic piece are configured to have a second attachment force that is more than the first attachment force.

8. The earphone assembly of claim 1, wherein the earphone further comprises a conductive member disposed on the earphone around a circumference of the earphone, and wherein the case body or the lid comprises a charging spring disposed on the case body or the lid and configured to be electrically coupled to the conductive member to charge the earphone.

9. An earphone case configured to store an earphone having a first magnetic piece, wherein the earphone case comprises:

a case body provided with an accommodating slot configured to accommodate the earphone; and a lid coupled to the case body, configured to open or close the case body, and comprising a second magnetic piece disposed on the lid and configured to magnetically attach to the first magnetic piece, wherein the earphone is configured to move with the lid and to detach from the accommodating slot when the lid is lifted to open the case body, and wherein the earphone is configured to attach to the lid and move with the lid until the earphone is accommodated in the accommodating slot when the lid is closed to close the case body.

10. The earphone case of claim 9, wherein the lid further comprises:

a side proximate to the accommodating slot and comprising a surface; and a locating slot provided on the surface and configured to accommodate the earphone.

11. The earphone case of claim 9, wherein the accommodating slot is configured to accommodate the earphone.

12. The earphone case of claim 9, wherein the accommodating slot comprises a third magnetic piece disposed in the accommodating slot and configured to magnetically couple to the first magnetic piece, wherein the third magnetic piece and the first magnetic piece are configured to have a first attachment force therebetween, and wherein the first magnetic piece and the second magnetic piece are configured to have a second attachment force that is more than the first attachment force.

13. A watch comprising:

a watch head comprising:

a head body provided with an accommodating slot; and a watch cover coupled to the head body, configured to open or close the head body, and comprising a second magnetic piece disposed on the watch cover;

a watch band configured to fasten the watch head to a part of a human body; and an earphone having a first magnetic piece configured to be accommodated in the accommodating slot, wherein the first magnetic piece is configured to magnetically attach to the second magnetic piece, wherein the earphone is configured to move with the watch cover and to detach from the accommodating slot when the watch cover is lifted to open the head body, and wherein the earphone is configured to attach to the watch cover and move with the watch cover until the earphone is accommodated in the accommodating slot when the watch cover is closed to close the head body.

14. The watch of claim 13, further comprising third magnetic pieces disposed around a circumference of the earphone and embedded in the earphone.

15. The watch of claim 13, wherein the watch cover further comprises:

a side proximate to the accommodating slot and comprising a surface; and a locating slot provided on the surface and configured to accommodate the earphone.

16. The watch of claim 15, wherein the locating slot comprises two slot sides, and wherein the second magnetic piece is further disposed on each of the two slot sides.

17. The watch of claim 13, wherein the accommodating slot is configured to accommodate the earphone.

18. The watch of claim 13, further comprising a third magnetic piece disposed in the accommodating slot and configured to magnetically couple to the first magnetic piece, wherein the third magnetic piece and the first magnetic piece are configured to have a first attachment force therebetween, and wherein the first magnetic piece and the second magnetic piece are configured to have a second attachment force that is more than the first attachment force.

19. The watch of claim 13, wherein the earphone further comprises a conductive member disposed on the earphone around a circumference of the earphone, and wherein the head body or the watch cover comprises a charging spring disposed on the head body or the watch cover and configured to be electrically coupled to the conductive member to charge the earphone.

20. The watch of claim 13, wherein the watch cover comprises a side located away from the head body, and wherein the watch further comprises a touch display disposed on the side.

* * * * *